(12) United States Patent
Ikeda et al.

(10) Patent No.: US 10,471,994 B2
(45) Date of Patent: Nov. 12, 2019

(54) VEHICLE FRONT STRUCTURE

(71) Applicant: TOYOTA JIDOSHA KABUSHIKI KAISHA, Toyota-shi, Aichi-ken (JP)

(72) Inventors: Akihiko Ikeda, Miyoshi (JP); Fumiaki Shigematsu, Gamagori (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 103 days.

(21) Appl. No.: 15/872,182

(22) Filed: Jan. 16, 2018

(65) Prior Publication Data

US 2018/0208247 A1 Jul. 26, 2018

(30) Foreign Application Priority Data

Jan. 26, 2017 (JP) ................................ 2017-011954

(51) Int. Cl.
*B60K 5/12* (2006.01)
*B62D 21/15* (2006.01)
*B62D 27/06* (2006.01)
*B62D 21/11* (2006.01)

(52) U.S. Cl.
CPC .......... *B62D 21/155* (2013.01); *B60K 5/1275* (2013.01); *B62D 21/11* (2013.01); *B62D 27/065* (2013.01)

(58) Field of Classification Search
CPC ... B62D 21/155; B62D 21/152; B60K 5/1275
See application file for complete search history.

(56) References Cited

U.S. PATENT DOCUMENTS

| | | | | |
|---|---|---|---|---|
| 6,298,936 B1* | 10/2001 | Yoshida | ............... | B60K 5/1216 180/232 |
| 7,850,227 B2* | 12/2010 | Tamakoshi | ............. | B62D 21/11 296/193.09 |
| 7,926,609 B2* | 4/2011 | Kusaka | ............... | B60G 99/004 180/232 |
| 7,992,926 B2* | 8/2011 | Tamakoshi | ........... | B62D 21/155 296/187.09 |

(Continued)

FOREIGN PATENT DOCUMENTS

| | | | | |
|---|---|---|---|---|
| DE | 2455790 A1 * | 6/1976 | ........... | B60K 5/1275 |
| FR | 2315422 A1 * | 1/1977 | ........... | B60K 5/1275 |

(Continued)

OTHER PUBLICATIONS

Partial Translation of May 28, 2019 Office Action issued in Japanese Patent Application No. 2017-011954.

*Primary Examiner* — Nicole T Verley
(74) *Attorney, Agent, or Firm* — Oliff PLC (57) ABSTRACT

A vehicle front structure includes a powertrain unit disposed in a front portion of a vehicle; a suspension cross member disposed behind the powertrain unit and extending in a vehicle width direction; and a bracket fastened to a boss portion provided in a housing of the powertrain unit. The bracket contacts a receiving surface of the suspension cross member due to backward movement of the powertrain unit during a vehicle front collision. The bracket includes a buffer portion disposed between a fastened portion that is fastened to the boss portion and a contact portion that contacts the receiving surface of the suspension cross member.

2 Claims, 6 Drawing Sheets

(56) References Cited

U.S. PATENT DOCUMENTS

| | | | |
|---|---|---|---|
| 8,490,988 B2 * | 7/2013 | Takeshita | B62D 21/155 |
| | | | 280/124.109 |
| 8,714,635 B2 * | 5/2014 | Tomozawa | B62D 21/155 |
| | | | 296/193.09 |
| 8,894,134 B2 * | 11/2014 | Tomozawa | B60K 5/00 |
| | | | 180/291 |
| 9,045,172 B2 * | 6/2015 | Gopal | B62D 21/11 |
| 9,553,491 B2 * | 1/2017 | Underwood | F02B 67/04 |
| 9,676,418 B1 * | 6/2017 | Mohammed | B62D 21/15 |
| 9,718,356 B1 * | 8/2017 | Ikeda | B60K 6/26 |
| 9,776,663 B1 * | 10/2017 | Craig | B62D 3/00 |
| 9,815,497 B1 * | 11/2017 | Schnug | B62D 21/152 |
| 9,914,480 B2 * | 3/2018 | Taguchi | B62D 21/11 |
| 9,963,171 B2 * | 5/2018 | Nagaosa | H01M 8/04201 |
| 9,987,912 B2 * | 6/2018 | Shinoda | B60K 1/04 |
| 10,183,705 B2 * | 1/2019 | Narahara | B62D 27/04 |
| 10,279,693 B2 * | 5/2019 | Shimizu | B62D 21/02 |
| 2018/0257472 A1 * | 9/2018 | Spurling | B60K 5/1275 |
| 2018/0312198 A1 * | 11/2018 | Shimizu | B62D 21/155 |
| 2018/0327032 A1 * | 11/2018 | Vacca | B60K 11/085 |
| 2018/0371990 A1 * | 12/2018 | Schenkel | F02B 75/34 |
| 2019/0016391 A1 * | 1/2019 | Inoue | B62D 21/155 |
| 2019/0118863 A1 * | 4/2019 | Hara | B62D 21/00 |
| 2019/0176891 A1 * | 6/2019 | Sawatzki | B62D 21/155 |
| 2019/0185059 A1 * | 6/2019 | Iimi | B62D 21/11 |

FOREIGN PATENT DOCUMENTS

| | | | |
|---|---|---|---|
| FR | 3031950 A1 * | 7/2016 | B60K 5/04 |
| GB | 1515469 A * | 6/1978 | B60K 5/1275 |
| JP | S55-165827 U | 11/1980 | |
| JP | 2007-162595 A | 6/2007 | |
| JP | 2009-101810 A | 5/2009 | |
| JP | 2016-112956 A | 6/2016 | |

* cited by examiner

VEHICLE FRONT STRUCTURE

INCORPORATION BY REFERENCE

The disclosure of Japanese Patent Application No. 2017-011954 filed on Jan. 26, 2017 including the specification, drawings and abstract is incorporated herein by reference in its entirety.

BACKGROUND

1. Technical Field

The disclosure relates to a vehicle front structure. In particular, the disclosure relates to improvement of a structure configured to suppress backward movement of a powertrain unit during a vehicle front collision.

2. Description of Related Art

It has been conventionally known that, when a powertrain unit (for example, a unit configured by including an engine, a transaxle, and the like in a vehicle with a front-engine, front-wheel-drive (FF) layout) moves toward a vehicle rear side (i.e., the powertrain unit moves backward) due to a collision load during a vehicle front collision, this powertrain unit contacts a suspension cross member that is disposed behind the powertrain unit and extends in a vehicle width direction. For example, Japanese Patent Application Publication No. 2016-112956 (JP 2016-112956 A) describes that a contact surface (a hitting surface) is provided at a rear end of the powertrain unit, a receiving surface is provided at a front end of the suspension cross member, and the contact surface of the powertrain unit that moves backward contacts the receiving surface of the suspension cross member during the vehicle front collision. Thus, an amount of backward displacement of the powertrain unit is reduced.

SUMMARY

In the configuration where a bracket is fastened to a boss portion formed in a housing of the powertrain unit and the contact portion provided in the bracket contacts the receiving surface of the suspension cross member during the vehicle front collision, the boss portion receives the large load (the collision load). Then, at this time, the boss portion may be broken, and thus, an effect of suppressing the backward movement of the powertrain unit may be reduced.

The disclosure provides a vehicle front structure that makes it possible to enhance an effect of suppressing backward movement of a powertrain unit by reducing a load that is input to a boss portion.

An aspect of the disclosure relates to a vehicle front structure including a powertrain unit disposed in a front portion of a vehicle; a suspension cross member disposed behind the powertrain unit and extending in a vehicle width direction; and a bracket fastened to a boss portion provided in a housing of the powertrain unit. The bracket contacts a receiving surface of the suspension cross member due to backward movement of the powertrain unit during a vehicle front collision. The bracket includes a buffer portion disposed between a fastened portion that is fastened to the boss portion and a contact portion that contacts the receiving surface of the suspension cross member.

With this configuration, the buffer portion of the bracket is deformed during the vehicle front collision, and a collision load is absorbed by this deformation. In addition, because the buffer portion is provided between the fastened portion fastened to the boss portion, and the contact portion that contacts the receiving surface of the suspension cross member, the collision load input to the boss portion is reduced as compared to a case where the buffer portion is not provided. Thus, breakage of the boss portion can be suppressed, and a fastened state of the bracket with respect to the boss portion (a fastened state of the fastened portion with respect to the boss portion) can be stabilized. In other words, the bracket can be stably fastened to the boss portion (the fastened portion can be stably fastened to the boss portion). Therefore, an effect of suppressing backward movement of the powertrain unit can be enhanced.

A plurality of the boss portions may be provided in the housing; the bracket may include a plurality of bolt insertion holes respectively corresponding to the boss portions; one of the bolt insertion holes may serve as a reference hole with a smallest hole diameter, and among the boss portions, a boss portion corresponding to the reference hole may be provided at a position having rigidity higher than rigidity of a position at which another boss portion is provided in the housing.

The collision load input to the boss portion corresponding to the reference hole provided in the bracket is larger than the collision load input to the rest of the boss portions because of the smallest hole diameter of the reference hole. In other words, since a backlash between an inner edge of the reference hole and a fastening bolt is small, in the case where the bracket slips with respect to the housing during the vehicle front collision, the backlash between the reference hole and the fastening bolt in the reference hole is first eliminated, and thus, the collision load input to this boss portion via the fastening bolt is large. However, because the boss portion corresponding to the reference hole is provided at the position having rigidity higher than the rigidity of the position at which the other boss portion is provided in the housing, the rigidity of the boss portion corresponding to the reference hole is sufficiently secured in the housing. Therefore, it is possible to suppress breakage of the boss portion that receives the large collision load during the vehicle front collision, and to enhance the effect of suppressing the backward movement of the powertrain unit.

In the above aspect of the disclosure, the buffer portion is provided between the fastened portion (the fastened portion fastened to the boss portion) and the contact portion (the contact portion that contacts the receiving surface of the suspension cross member) in the bracket that is fastened to the boss portion provided in the housing of the powertrain unit and that contacts the suspension cross member during the vehicle front collision. Thus, during the vehicle front collision, the buffer portion of the bracket is deformed such that the collision load is absorbed. Therefore, the collision load that is input to the boss portion can be reduced, and the effect of suppressing the backward movement of the powertrain unit can be enhanced.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter a description will be provided on an embodiment of the disclosure on the basis of the drawings. In the embodiment, a description will be provided on a case where the disclosure is applied to a hybrid vehicle with a front-engine, front-wheel-drive (FF) layout.

Figure 1:
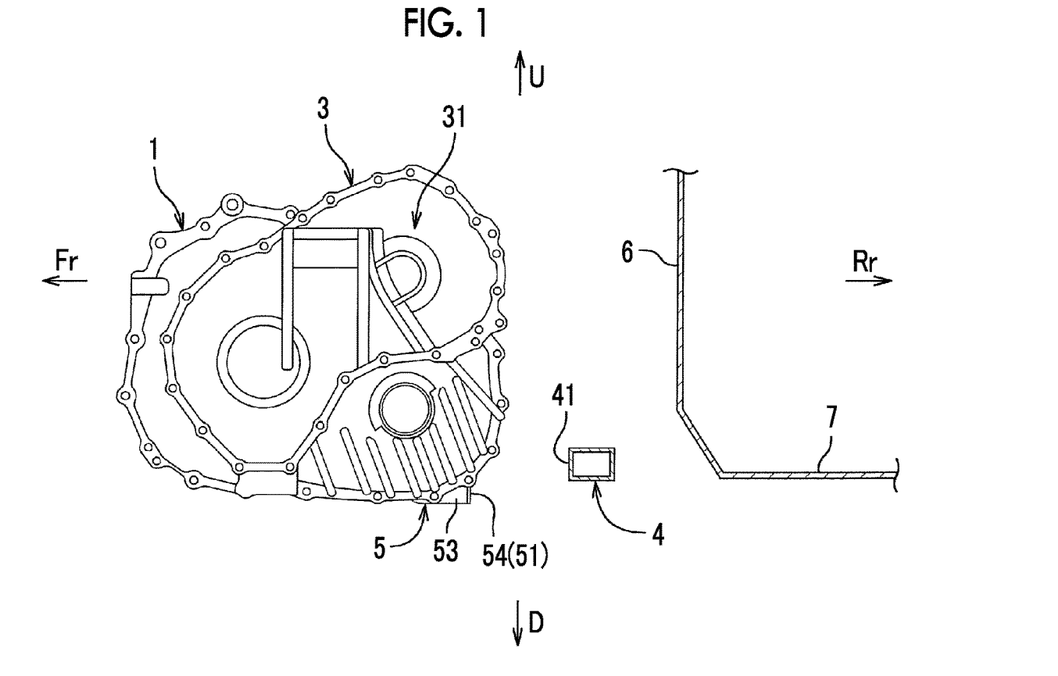
FIG. 1 is a side view of an arrangement layout of a powertrain unit and a suspension cross member in an embodiment.

FIG. 1 is a side view of an arrangement layout of a powertrain unit 1 and a suspension cross member 4 as a vehicle front structure according to the embodiment. In FIG. 1, an arrow Fr, an arrow Rr, an arrow U, and an arrow D respectively represent a vehicle front side, a vehicle rear side, an upper side, and a lower side. As shown in FIG. 1, the powertrain unit 1 and the suspension cross member 4 are disposed in a front portion of the vehicle. The suspension cross member 4 is disposed behind the powertrain unit 1 and extends in a vehicle width direction.

The powertrain unit 1 has a structure in which an engine 2 (see imaginary lines in FIG. 2 and FIG. 3), a transaxle 3, and the like are integrally assembled.

Figure 2:
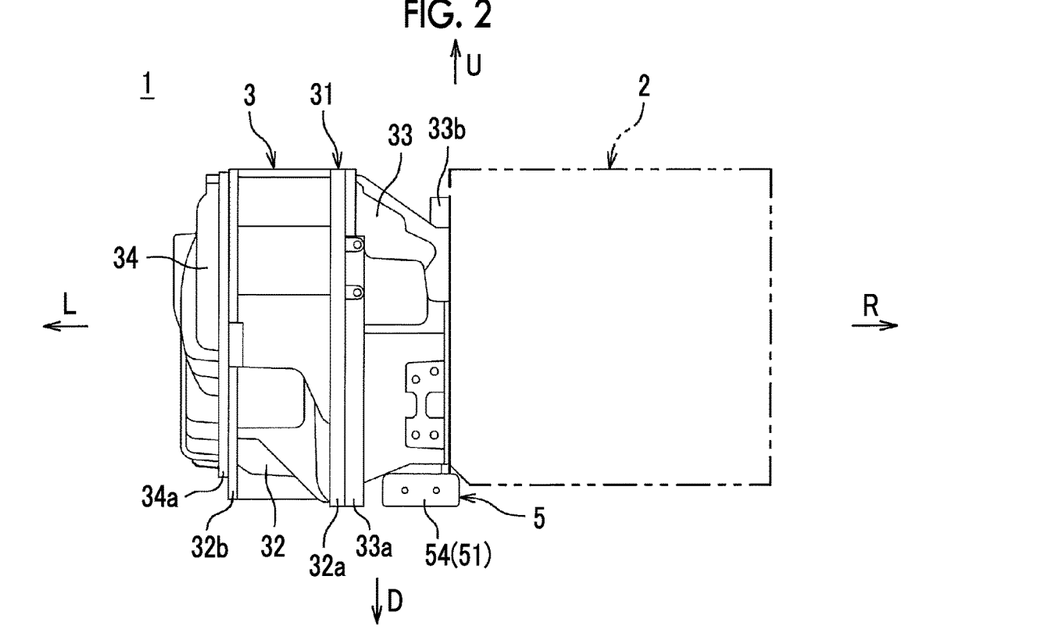
FIG. 2 is a rear view of the powertrain unit in the embodiment.
Figure 3:
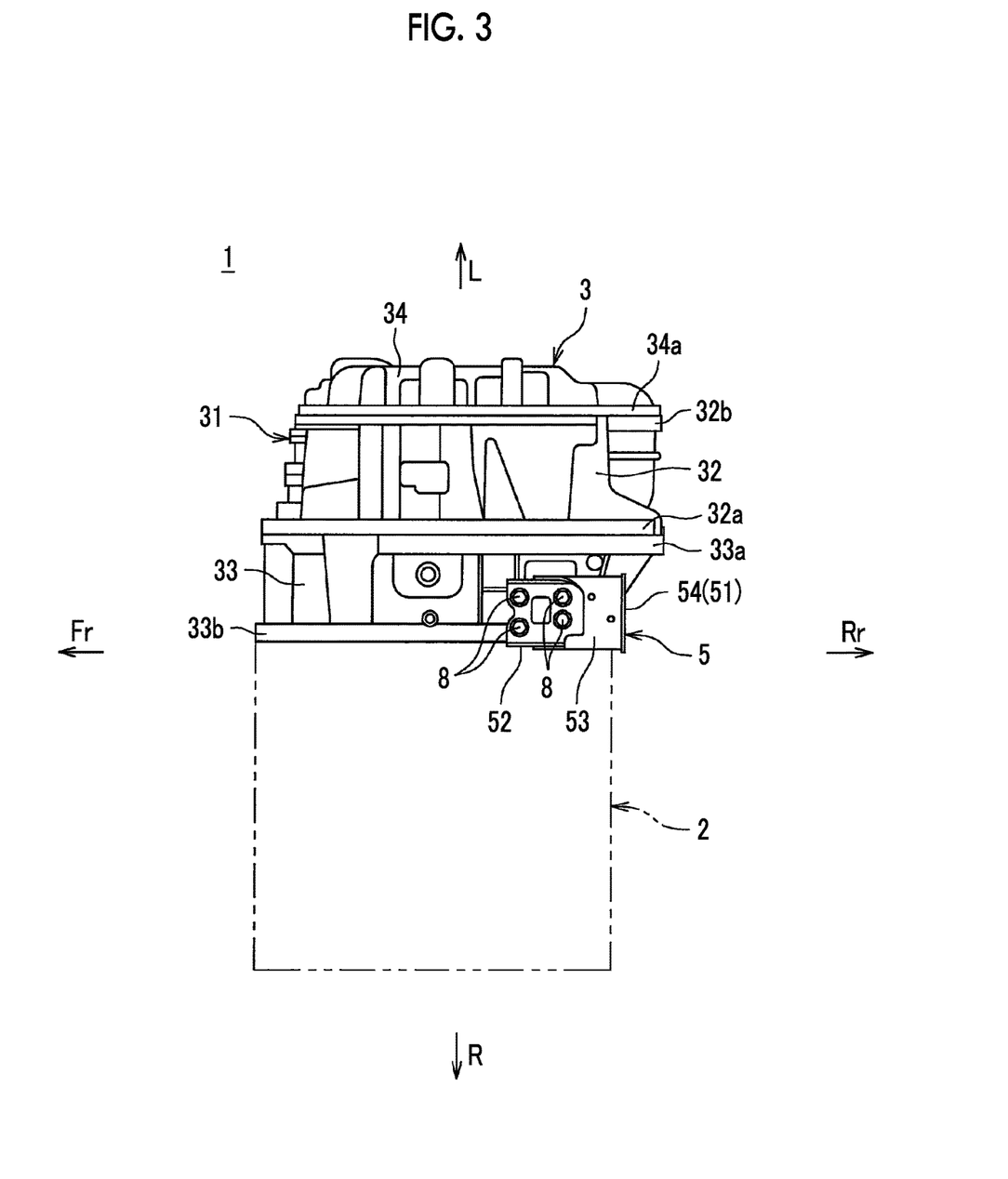
FIG. 3 is a bottom view of the powertrain unit in the embodiment.

FIG. 2 is a rear view of the powertrain unit 1 (a view that is seen from the vehicle rear side). FIG. 3 is a bottom view of the powertrain unit 1. In these FIG. 2 and FIG. 3, the arrow Fr, the arrow Rr, the arrow U, the arrow D, an arrow R, and an arrow L respectively represent the vehicle front side, the vehicle rear side, the upper side, the lower side, a vehicle right side, and a vehicle left side. In the transaxle 3, a damper, a planetary gear, a generator motor, a travel drive motor, a differential device, and the like, which are not shown, are accommodated in a transaxle case 31. The transaxle case 31 has a structure in which a transaxle case main body 32, a transaxle housing 33, and a cover 34 are integrally assembled. The transaxle housing 33 is connected to one side (a side where the engine 2 is disposed) of the transaxle case main body 32, and the cover 34 is connected to the other side (a side opposite to the side where the engine 2 is disposed) of the transaxle case main body 32. More specifically, attachment flanges 32a, 32b are respectively provided on the one side and the other side of the transaxle case main body 32. The attachment flange 32a, which is attached to the one side of the transaxle case main body 32, is connected to an attachment flange 33a provided in the transaxle housing 33. The attachment flange 32b which is provided on the other side of the transaxle case main body 32 is connected to an attachment flange 34a provided in the cover 34. In addition, an attachment flange 33b is provided on the side of the transaxle housing 33 where the engine 2 is disposed, and the attachment flange 33b is connected to the engine 2. A four-cylinder gasoline engine is adopted as the engine 2, for example.

As described above, the engine 2 and the transaxle 3 are integrally assembled and constitute the powertrain unit 1. Drive power of the engine 2 that is output from a crankshaft (not shown) of the engine 2 is input to the planetary gear via the damper. The drive power of the engine 2, which has been input to the planetary gear, is divided by the planetary gear and is then transmitted to the generator motor and the differential device. A casing (the transaxle case 31, a cylinder block of the engine 2, and the like) of the powertrain unit 1 that is configured as described above may be regarded as a housing of a powertrain unit according to the disclosure.

The suspension cross member 4 is a vehicle body structural member that supports an unillustrated front-wheel suspension device. The suspension cross member 4 has a rectangular closed cross-section structure, and has high rigidity. The suspension cross member 4 is disposed in a lower part of a space between the powertrain unit 1 and a dash panel (a panel that separates an engine compartment and a vehicle cabin) 6. A height position at which the suspension cross member 4 is disposed is set to be substantially the same as a height position of a floor panel 7 that constitutes a floor surface of the vehicle cabin.

Next, a description will be provided on a structure provided to absorb a collision load during a vehicle front collision as a characteristic of the embodiment. In the collision load absorption structure, when the powertrain unit 1 moves toward the vehicle rear side (i.e., when the powertrain unit 1 moves backward) due to the collision load during the vehicle front collision, the powertrain unit 1 contacts the suspension cross member 4 such that the collision load is absorbed and an amount of backward displacement of the powertrain unit 1 is reduced.

As described above, the suspension cross member 4 is configured to have the rectangular closed cross-section structure. A front surface (a surface facing the powertrain unit 1) 41 of the suspension cross member 4 is formed as a plane that extends in a vertical direction. Because the powertrain unit 1 that moves backward contacts the front surface 41 of the suspension cross member 4 during the vehicle front collision, the front surface 41 will hereinafter be referred to as a receiving surface 41.

A contact bracket (that may be regarded as a bracket according to the disclosure) 5 is attached to a lower surface of the transaxle housing 33 of the transaxle case 31, and the contact bracket 5 faces the receiving surface 41 of the suspension cross member 4 with a specified clearance therebetween in a vehicle front-rear direction. That is, when the powertrain unit 1 moves backward during the vehicle front collision, a rear surface 51 of the contact bracket 5 contacts the receiving surface 41 of the suspension cross member 4. Note that, in a state shown in FIG. 1 (a state where the vehicle front collision does not occur), an upper region of the rear surface 51 of the contact bracket 5 faces a lower region of the receiving surface 41 of the suspension cross member 4. The configuration is adopted to obtain a large contact area between the receiving surface 41 of the suspension cross member 4 and the rear surface 51 of the contact bracket 5 in the case where the suspension cross member 4 slightly moves downward as deformation of a front body portion of the vehicle during the vehicle front collision, as described below (see FIG. 7).

Figure 4:
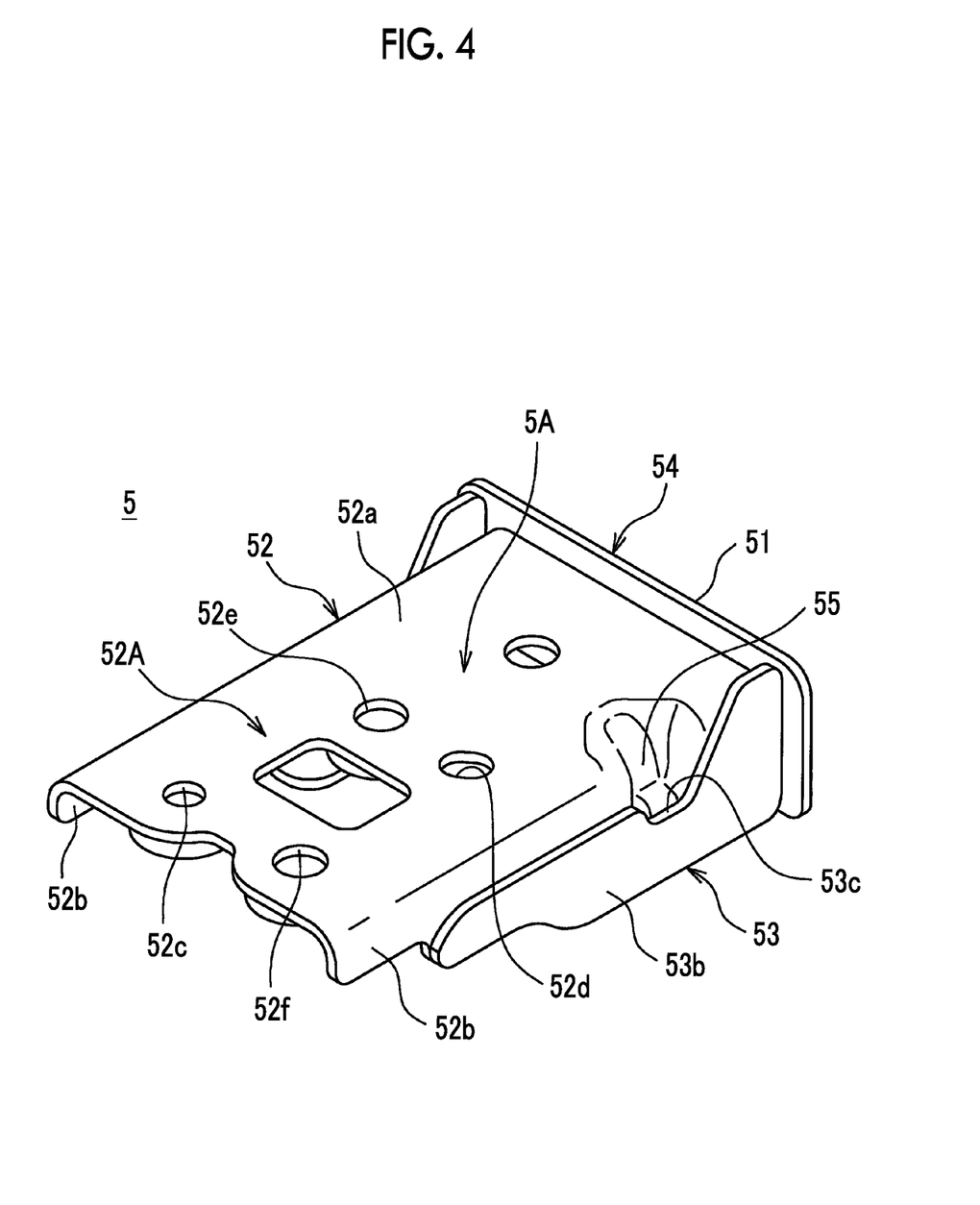
FIG. 4 is a perspective view of a contact bracket.
Figure 5A:
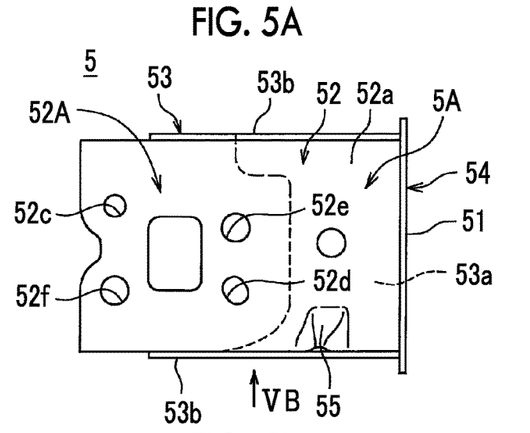
FIG. 5A to FIG. 5E are views of the contact bracket, FIG. 5A being a plan view, FIG. 5B being a view that is seen in a direction indicated by an arrow VB in FIG. 5A, FIG. 5C being a bottom view, FIG. 5D being a view that is seen in a direction indicated by an arrow VD in FIG. 5B, and FIG. 5E being a sectional view that is taken along line VE-VE in FIG. 5B.
Figure 5B:
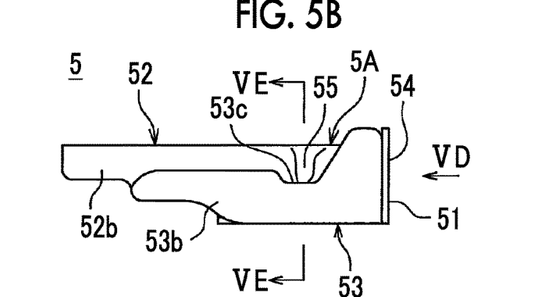
Figure 5C:
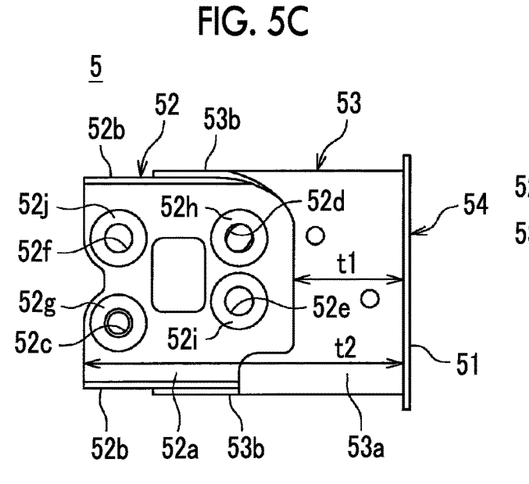
Figure 5D:
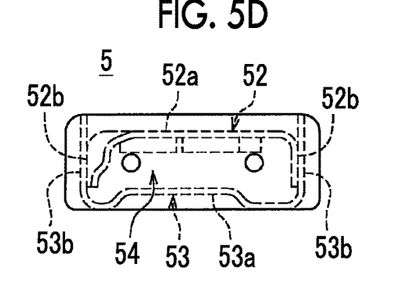
Figure 5E:
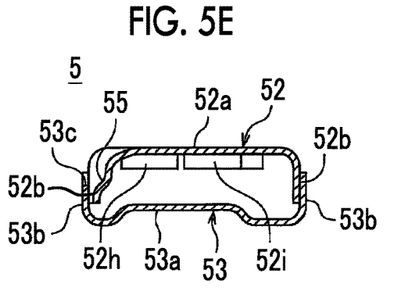

Hereinafter, a description will be provided on a structure of the contact bracket 5. FIG. 4 is a perspective view of the contact bracket 5. FIG. 5A to FIG. 5E are views of the contact bracket 5. FIG. 5A is a plan view. FIG. 5B is a view that is seen in a direction indicated by an arrow VB in FIG. 5A. FIG. 5C is a bottom view. FIG. 5D is a view that is seen in a direction indicated by an arrow VD in FIG. 5B. FIG. 5E is a sectional view that is taken along line VE-VE in FIG. 5B.

As shown in these drawings, the contact bracket 5 has a structure in which an upper plate 52, a lower plate 53, and a contact plate 54 are integrally joined by, for example, welding.

Each of the upper plate 52 and the lower plate 53 is formed by folding a metal plate material. More specifically, the upper plate 52 and lower plate 53 respectively include: base plate portions 52a, 53a; and side plate portions 52b, 53b. The side plate portions 52b respectively extend from both sides of the base plate portion 52a (both sides thereof in the vehicle width direction in a state where the contact bracket 5 is attached to the lower surface of the transaxle housing 33). The side plate portions 53b respectively extend from both sides of the base plate portion 53a (both sides thereof in the vehicle width direction in a state where the contact bracket 5 is attached to the lower surface of the transaxle housing 33). A distance between outer surfaces of the side plate portions 52b, 52b of the upper plate 52 substantially coincides with a distance between inner surfaces of the side plate portions 53b, 53b of the lower plate 53. In addition, the inner surfaces of the side plate portions 53b, 53b of the lower plate 53 are respectively overlapped with the outer surfaces of the side plate portions 52b, 52b of the upper plate 52 such that the base plate portion 52a of the upper plate 52 faces the base plate portion 53a of the lower plate 53 with a specified distance therebetween. Then, the side plate portions 52b, 53b are integrally joined. That is, the upper plate 52 is disposed such that the side plate portions 52b, 52b extend downward with respect to the base plate portion 52a of the upper plate 52. The lower plate 53 is disposed such that the side plate portions 53b, 53b extend upward with respect to the base plate portion 53a of the lower plate 53. Then, the side plate portions 52b, 53b are integrally joined.

In a state where the upper plate 52 and the lower plate 53 are joined as described above, distal edges (right end edges in FIG. 5A and FIG. 5B) of the plates 52, 53 are located on the same imaginary plane, and the contact plate 54 is joined to the distal edges. A width (a height in FIG. 5B and FIG. 5D) of the contact plate 54 substantially coincides with a height of the distal edge of the lower plate 53. When the powertrain unit 1 moves backward during the vehicle front collision, the rear surface 51 of the contact plate 54 contacts the receiving surface 41 of the suspension cross member 4. Thus, the rear surface 51 of the contact plate 54 may be regarded as "a contact portion that contacts the receiving surface of the suspension cross member" according to the disclosure.

A length of the base plate portion 53a of the lower plate 53 (a length thereof in the vehicle front-rear direction in the state where the contact bracket 5 is attached to the lower surface of the transaxle housing 33; a length thereof in a right-left direction in FIG. 5A and FIG. 5C, that is, a length t1 in FIG. 5C) is set to be shorter than a length of the base plate portion 52a of the upper plate 52 (a length t2 in FIG. 5C). The configuration is adopted to prevent the base plate portion 53a of the lower plate 53 from interfering with fastening bolts 8 (see FIG. 3) at a time when the fastening bolts 8 are respectively inserted through bolt insertion holes 52c to 52f that are formed in the base plate portion 52a of the upper plate 52, as described below.

Figure 6:
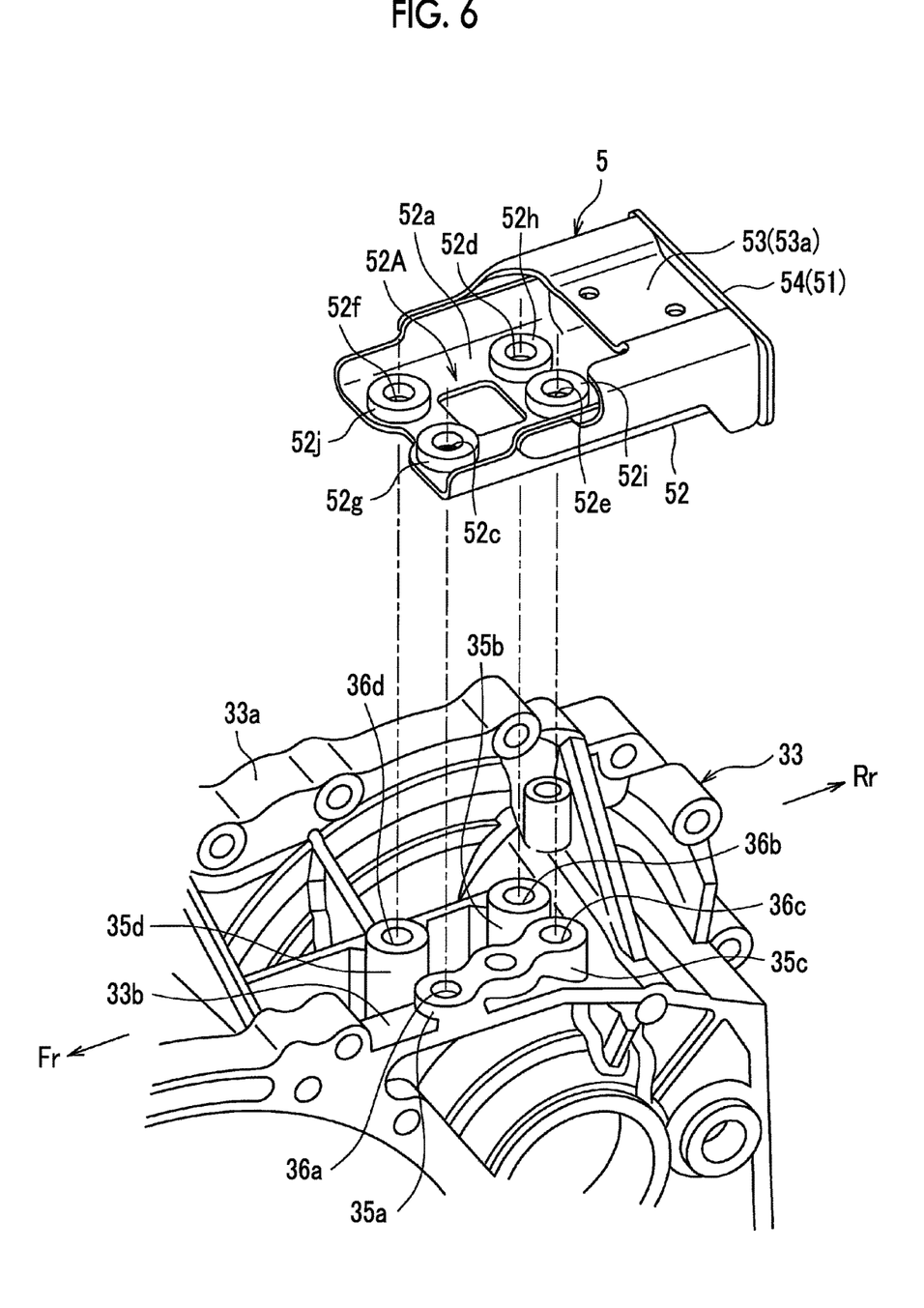
FIG. 6 is a perspective view that illustrates an operation of attaching the contact bracket to a transaxle housing.

The bolt insertion holes 52c to 52f are formed at four positions in the base plate portion 52a of the upper plate 52. The bolt insertion holes 52c to 52f are holes through which the fastening bolts 8 are respectively inserted, and the fastening bolts 8 are used to fasten the contact bracket 5 to the lower surface of the transaxle housing 33. That is, as shown in FIG. 6 (a perspective view that illustrates an operation of attaching the contact bracket 5 to the transaxle housing 33), the lower surface (a surface facing an upper side in FIG. 6) of the transaxle housing 33 includes boss portions 35a to 35d, and the boss portions 35a to 35d have fastening holes (bolt holes provided with female threads) 36a to 36d that correspond to the bolt insertion holes 52c to 52f, respectively. Then, in a state where the bolt insertion holes 52c to 52f of the upper plate 52 are respectively aligned with the fastening holes 36a to 36d of the boss portions 35a to 35d, the fastening bolts 8 (see FIG. 3) are inserted through the bolt insertion holes 52c to 52f and the fastening holes 36a to 36d from a lower side (the upper side in the state shown in FIG. 6). In this way, the contact bracket 5 is fastened to the lower surface of the transaxle housing 33.

More specifically, as the bolt insertion holes 52c to 52f that are formed in the base plate portion 52a of the upper plate 52, as shown in FIG. 4 and FIG. 5A and FIG. 5C, a first bolt insertion hole 52c, a second bolt insertion hole 52d, a third bolt insertion hole 52e, and a fourth bolt insertion hole 52f are provided. The first bolt insertion hole 52c is circular and serves as a reference hole. The second bolt insertion hole 52d is formed as an elongate hole. Each of the third bolt insertion hole 52e and the fourth bolt insertion hole 52f is circular and has a slightly larger diameter than that of the first bolt insertion hole 52c. Thus, the first bolt insertion hole 52c has a hole diameter that is the smallest among the hole diameters of the plurality of bolt insertion holes 52c to 52f. The first bolt insertion hole 52c serves as the reference hole used to position the contact bracket 5 with respect to the lower surface of the transaxle housing 33.

The second bolt insertion hole 52d and the third bolt insertion hole 52e are formed at the positions closer to the contact plate 54 than the first bolt insertion hole 52c and the fourth bolt insertion hole 52f are. In other words, the first bolt insertion hole 52c and the fourth bolt insertion hole 52f are formed at the positions on the opposite side of the second bolt insertion hole 52d and the third bolt insertion hole 52e from the contact plate 54. Each of the formation positions of the second bolt insertion hole 52d and the third bolt insertion hole 52e is set to be a position at a relatively long distance from the rear surface 51 of the contact plate 54. In this way, a crushable zone 5A, which will be described below, is formed between the rear surface 51 of the contact plate 54, and the second and third bolt insertion holes 52d, 52e. Note that, as shown in FIG. 5C, bolt receiving plates 52g to 52j are joined to a back surface of the base plate portion 52a of the upper plate 52 so as to correspond to the bolt insertion holes 52c to 52f, respectively.

As the boss portions 35a to 35d, as shown in FIG. 6, a first boss portion 35a, a second boss portion 35b, a third boss portion 35c, and a fourth boss portion 35d are provided. The first boss portion 35a has the first fastening hole 36a that corresponds to the first bolt insertion hole 52c. The second boss portion 35b has the second fastening hole 36b that corresponds to the second bolt insertion hole 52d. The third boss portion 35c has the third fastening hole 36c that corresponds to the third bolt insertion hole 52e. The fourth boss portion 35d has the fourth fastening hole 36d that corresponds to the fourth bolt insertion hole 52f.

One of characteristics of the embodiment is disposition positions (formation positions) of the boss portions 35a to 35d, that is, positions at which the boss portions 35a to 35d are disposed. The boss portions 35a to 35d are provided to fasten the contact bracket 5 to the lower surface of the transaxle housing 33. Among the boss portions 35a to 35d, the first boss portion 35a that has the first fastening hole 36a is integrally formed in the attachment flange 33b of the transaxle housing 33. As described above, the attachment flange 33b is a portion that is connected to the engine 2, and thus has high rigidity. That is, the first boss portion 35a is formed at a high rigid position in the transaxle housing 33. Note that, in the embodiment, the third boss portion 35c that has the third fastening hole 36c is also integrally formed in the attachment flange 33b of the transaxle housing 33. On the lower surface of the transaxle housing 33, the second boss portion 35b that has the second fastening hole 36b and the fourth boss portion 35d that has the fourth fastening hole 36d are formed at positions that are separated from the attachment flange 33b (i.e., positions having lower rigidity than that of the attachment flange 33b). Thus, the first boss portion 35a (the boss portion that corresponds to the reference hole (the first bolt insertion hole 52c)) is formed at the position having rigidity higher than that of each of the positions at which the second boss portion 35b and the fourth boss portion 35d are formed in the transaxle housing 33.

When the formation position of the first boss portion 35a and the formation position of the third boss portion 35c are compared with each other, the formation position of the first boss portion 35a is located closer to a center of the transaxle housing 33 in the vehicle front-rear direction than the formation position of the third boss portion 35c is. In addition, the lower surface of the transaxle housing 33 (particularly, a lower surface of the attachment flange 33b) has a shape that bulges (protrudes) downward (i.e., a shape that is inclined downward) in a direction toward the center side in the vehicle front-rear direction. A height position of an attachment seat surface of the first boss portion 35a and a height position of an attachment seat surface of the third boss portion 35c are set to be substantially the same height position such that the base plate portions 52a, 53a of the contact bracket 5 extend in a substantially horizontal direction in a state where the contact bracket 5 is attached to the lower surface of the transaxle housing 33. Accordingly, when protruding lengths of the first boss portion 35a and the third boss portion 35c from the lower surface of the transaxle housing 33 are compared, the protruding length of the first boss portion 35a is shorter than the protruding length of the third boss portion 35c. Thus, the first boss portion 35a has the rigidity higher than that of the third boss portion 35c.

Another characteristic of the embodiment is that the contact bracket 5 is provided with the crushable zone 5A that is deformed when the collision load is input to the contact bracket 5 (in other words, a deformation amount of the crushable zone 5A is larger than deformation amounts of other portions (i.e., the rest of the contact bracket 5) when the collision load is input to the contact bracket 5). The crushable zone 5A is a region between the rear surface 51 of the contact plate 54 and the second and third bolt insertion holes 52d, 52e. The crushable zone 5A is formed by securing the long distance from the rear surface 51 of the contact plate 54 to each of the second bolt insertion hole 52d and the third bolt insertion hole 52e. Thus, when the collision load is input from the rear surface 51 of the contact plate 54, the crushable zone 5A is deformed, and thus, the collision load is sufficiently absorbed so as to reduce the collision load input to the fastening bolts 8 and the boss portions 35a to 35d. The crushable zone 5A may be regarded as a buffer portion according to the disclosure.

A fragile portion 55 is provided in the crushable zone (the buffer portion) 5A. As shown in FIG. 4, FIG. 5A, FIG. 5B, and FIG. 5E, the fragile portion 55 is a boundary portion between the base plate portion 52a and one (on a near side (right side) in FIG. 4) of the side plate portions 52b in the contact bracket 5 and is formed between a fastened portion 52A and the rear surface 51 of the contact plate 54. The fastened portion 52A is a region in which the bolt insertion holes 52c to 52f are formed, and the rear surface 51 of the contact plate 54 is the contact portion that contacts the receiving surface 41 of the suspension cross member 4.

More specifically, the fragile portion 55 is configured such that a part (a part near the side plate portion 52b) of the base plate portion 52a of the upper plate 52 is curved (recessed) downward and a part (an upper part near the base plate portion 52a) of the side plate portion 52b of the upper plate 52 is curved (recessed) inward. Accordingly, in the case where the rear surface 51 of the contact plate 54 contacts the receiving surface 41 of the suspension cross member 4 and the collision load acts on the contact plate 54 during the vehicle front collision, the fragile portion 55 of the contact bracket 5 is deformed, and thus, the entire crushable zone 5A is significantly deformed. Thus, the collision load is absorbed. Note that a shape of the fragile portion 55 including, for example, a dimension of the downward curved part of the base plate portion 52a and a dimension of the inward curved part of the side plate portion 52b is appropriately set on the basis of an experiment or a simulation such that the collision load is sufficiently absorbed by the entire crushable zone 5A due to the deformation of the fragile portion 55.

In the lower plate 53, at an upper end edge of the side plate portion (the side plate portion on the near side (right side) in FIG. 4) 53b that corresponds to a formation position of the fragile portion 55, a recessed portion 53c is formed to be slightly curved downward. This portion of the side plate portion 53b in the lower plate 53 has low rigidity. Thus, the fragile portion 55 is appropriately deformed.

Next, a description will be provided on an operation during the vehicle front collision.

Figure 7:
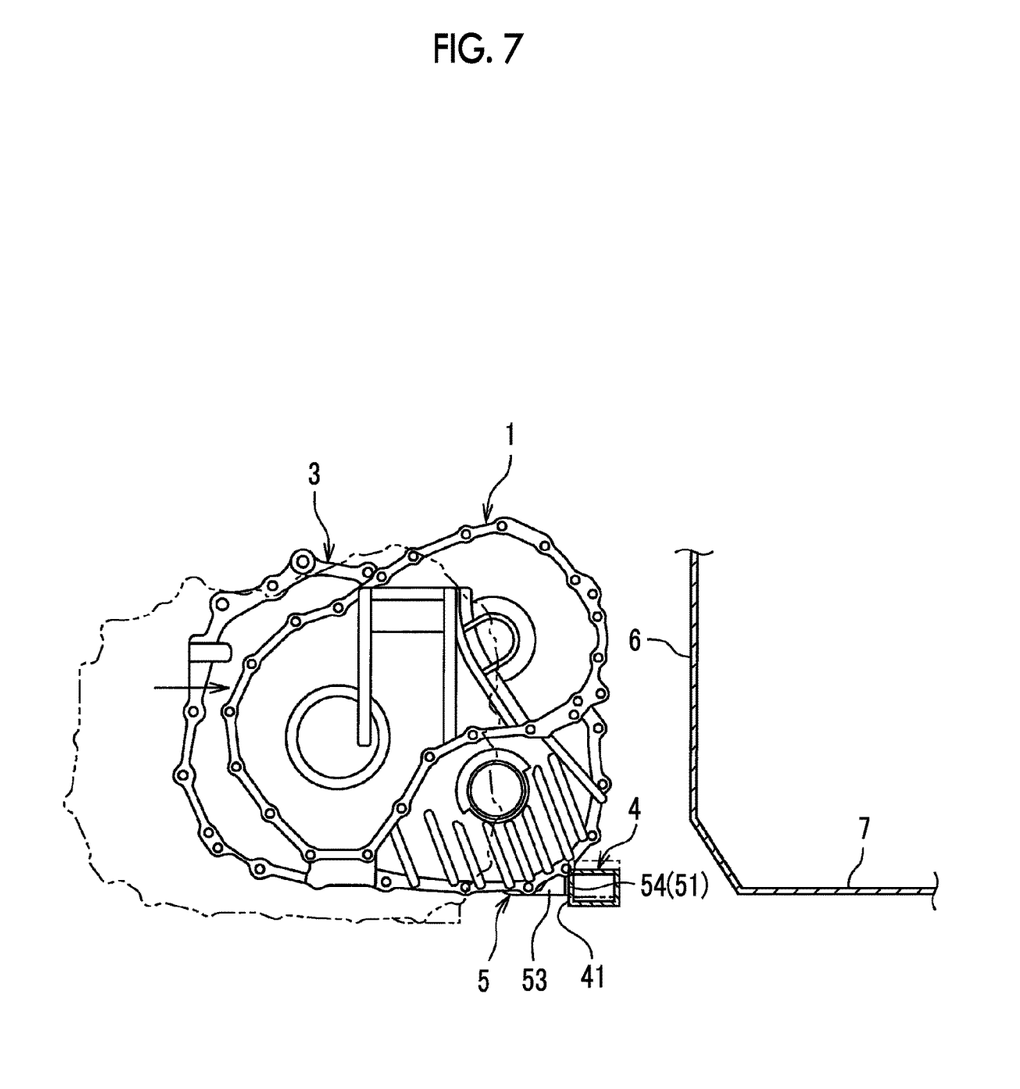
FIG. 7 is a view that corresponds to FIG. 1 and illustrates a state where the powertrain unit contacts the suspension cross member during a vehicle front collision.

During the vehicle front collision, the collision load acts on the powertrain unit 1, and the powertrain unit 1 moves backward as shown in FIG. 7. At this time, as the deformation of the front body portion of the vehicle, the suspension cross member 4 slightly moves downward. In FIG. 7, imaginary lines show a state of the powertrain unit 1 prior to the backward movement and a state of the suspension cross member 4 prior to the downward movement.

Due to the backward movement of the powertrain unit 1, the contact bracket 5 contacts the receiving surface 41 of the suspension cross member 4. Then, due to the absorption of the load by the suspension cross member 4, the backward movement of the powertrain unit 1 is suppressed.

In addition, in the embodiment, the entire crushable zone 5A (see FIG. 4) is significantly deformed due to the deformation of the fragile portion 55 of the contact bracket 5 during the vehicle front collision, and the collision load is absorbed by the deformation. Because the crushable zone 5A is formed between the fastened portion 52A, which is fastened to the boss portions 35a to 35d, and the rear surface 51 of the contact plate 54, which contacts the receiving surface 41 of the suspension cross member 4, the collision load input to the boss portions 35a to 35d is reduced. Thus, breakage of the boss portions 35a to 35d can be suppressed, and accordingly, a fastened state of the contact bracket 5 with respect to the boss portions 35a to 35d (a fastened state of the fastened portion 52A with respect to the boss portions 35a to 35d) can be stabilized. In other words, the contact bracket 5 is stably fastened to the boss portions 35a to 35d (the fastened portion 52A is stably fastened to the boss portions 35a to 35d). In particular, the collision load input to the first boss portion 35a, which corresponds to the first bolt insertion hole 52c as the reference hole formed in the contact bracket 5, is larger than that input to each of the other boss portions 35b to 35d because of the smallest hole diameter of the first bolt insertion hole 52c. In other words, since a backlash between an inner edge of the first bolt insertion hole 52c and the fastening bolt 8 is small, in the case where the contact bracket 5 slips with respect to the transaxle housing 33 during the vehicle front collision, the backlash between the first bolt insertion hole 52c and the fastening bolt 8 in the first bolt insertion hole 52c is first eliminated, and thus the collision load input to the first boss portion 35a via the fastening bolt 8 is large. However, because the first boss portion 35a is formed at the position having rigidity higher than that of each of the positions at which the second boss portion 35b and the fourth boss portion 35d are formed in the transaxle housing 33, the rigidity of the first boss portion 35a is sufficiently secured. Thus, it is possible to suppress breakage of the first boss portion 35a. As a result, the effect of suppressing the backward movement of the powertrain unit 1 can be enhanced, and thus an adverse effect on the vehicle cabin, which is caused by the backward movement of the powertrain unit 1, can be suppressed.

As described above, since the crushable zone 5A is provided, the collision load that is input to the boss portions 35a to 35d can be reduced. In addition, the rigidity of the first boss portion 35a can be sufficiently secured by forming the first boss portion 35a in the existing attachment flange 33b of the transaxle housing 33. Thus, it is possible to suppress breakage of the first boss portion 35a without increasing weight and manufacturing cost, and to enhance the effect of suppressing the backward movement of the powertrain unit 1.

Note that the disclosure is not limited to the above embodiment, and various changes and modifications may be made without departing from the scope of the disclosure.

For example, in the above embodiment, the crushable zone 5A is formed by securing the long distance from the rear surface 51 of the contact plate 54 to each of the second bolt insertion hole 52d and the third bolt insertion hole 52e, and the fragile portion 55 is provided in the crushable zone 5A. Thus, the buffer portion is provided. However, the disclosure is not limited to this configuration. The buffer portion may be provided only by securing the long distance from the rear surface 51 of the contact plate 54 to each of the second bolt insertion hole 52d and the third bolt insertion hole 52e. Alternatively, the buffer portion may be provided only by providing the fragile portion 55.

In the above embodiment, the contact bracket 5 is formed by integrating the metal plate materials by welding. However, the disclosure is not limited to this configuration. The contact bracket 5 may be formed of a casting or a resin material with required strength such as fiber reinforced plastic (FRP). As described above, a method of processing the contact bracket 5 is not particularly limited.

In the above embodiment, the fragile portion 55 is provided at the only one position between the fastened portion 52A and the rear surface 51 of the contact plate 54 in the contact bracket 5. However, the disclosure is not limited to this configuration, and the fragile portion 55 may be provided at a plurality of positions between the fastened portion 52A and the rear surface 51 of the contact plate 54. In addition, the structure of the fragile portion 55 is not limited to the structure in which a part of the upper plate 52 is curved as in the above embodiment. For example, the fragile portion may be provided by forming a hole in a part of the upper plate 52. Alternatively, the fragile portion may be formed in the lower plate 53 or both of the upper plate 52 and the lower plate 53.

In the above embodiment, the description has been provided on the case where the disclosure is applied to the vehicle on which the gasoline engine 2 is mounted. However, the disclosure is not limited thereto and can be also applied to a vehicle on which another internal combustion engine such as a diesel engine is mounted. In addition, the number of the cylinders and a type (V-type, horizontally-opposed type, or the like) of the engine are not particularly limited.

In the above embodiment, the description has been provided on the case where the disclosure is applied to the hybrid vehicle (the vehicle on which the engine and the generator motor are mounted as drive power sources). However, the disclosure can also be applied to a conventional vehicle (a vehicle on which only the engine is mounted as the drive power source).

The disclosure can be applied to the vehicle front structure that absorbs the collision load by causing the powertrain unit to contact the suspension cross member during the vehicle front collision and thereby suppresses the backward movement of the powertrain unit.

What is claimed is:

1. A vehicle front structure comprising:
   a powertrain unit disposed in a front portion of a vehicle;
   a suspension cross member disposed behind the powertrain unit and extending in a vehicle width direction; and
   a bracket fastened to a plurality of boss portions provided in a housing of the powertrain unit, wherein
   the bracket contacts a receiving surface of the suspension cross member due to backward movement of the powertrain unit during a vehicle front collision,
   the bracket includes a buffer portion disposed between a fastened portion that is fastened to the boss portions and a contact portion that contacts the receiving surface of the suspension cross member,
   the bracket includes a plurality of bolt insertion holes respectively corresponding to the boss portions,
   one of the bolt insertion holes serves as a reference hole with a smallest hole diameter, and
   among the boss portions, a boss portion corresponding to the reference hole is provided at a position having rigidity higher than rigidity of a position at which another boss portion is provided in the housing.

2. A vehicle front structure comprising:
   a powertrain unit disposed in a front portion of a vehicle;
   a suspension cross member disposed behind the powertrain unit and extending in a vehicle width direction; and
   a bracket fastened to a boss portion provided in a housing of the powertrain unit, wherein
   the bracket contacts a receiving surface of the suspension cross member due to backward movement of the powertrain unit during a vehicle front collision,
   the bracket includes a buffer portion disposed between a fastened portion that is fastened to the boss portion and a contact portion that contacts the receiving surface of the suspension cross member, and, at least one fragile portion is provided in the buffer portion.

* * * * *